H. BLUE.
Plows.

No. 147,036. Patented Feb. 3, 1874.

WITNESSES:

INVENTOR:
H. Blue
BY
ATTORNEYS.

UNITED STATES PATENT OFFICE.

HARVEY BLUE, OF MEDINA, WISCONSIN.

IMPROVEMENT IN PLOWS.

Specification forming part of Letters Patent No. 147,036, dated February 3, 1874; application filed November 22, 1873.

*To all whom it may concern:*

Figure 1:
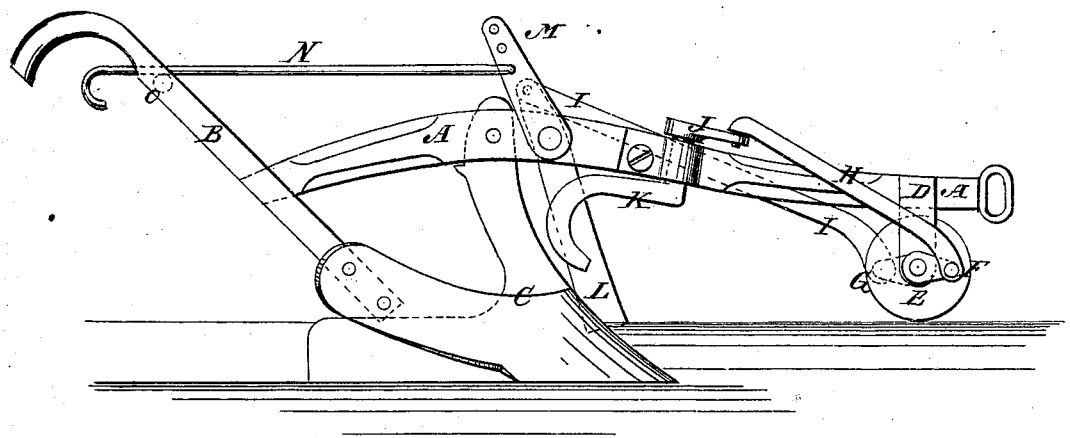
Figure 2:
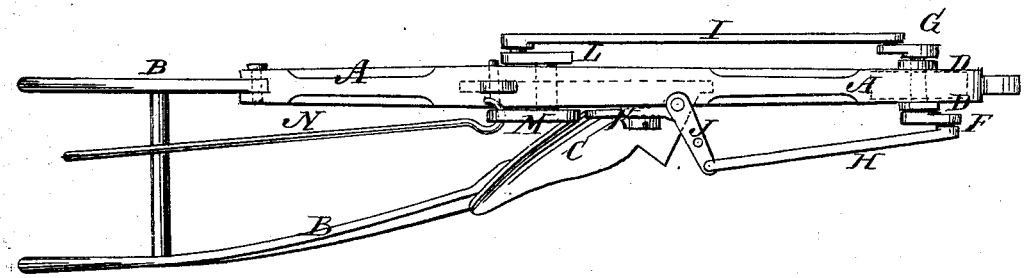

Be it known that I, HARVEY BLUE, of Medina, in the county of Outagamie and State of Wisconsin, have invented a new and useful Improvement in Plows, of which the following is a specification:

Figure 1 is a side view of my improved plow. Fig. 2 is a top view of the same.

Similar letters of reference indicate corresponding parts.

The invention will first be fully described, and then pointed out in the claim.

A is the plow-beam, B are the handles, and C is the plow, about the construction of which parts there is nothing new. To the forward part of the beam A are attached two brackets, D, to and between the lower ends of which is pivoted a wheel, E, which receives motion from contact with the ground. To the projecting ends of the journals of the wheel E are attached cranks F G, projecting in opposite directions, and to which are pivoted the forward ends of the connecting-rods H I, respectively. The rear end of the connecting-rod H is pivoted to the crank-arm J, formed upon the forward end of the hook K, which is pivoted to the side of the beam A, over the plow-point, and the hook of which passes down in front of the upper part of the colter of the plow C, so that the forward movement of the plow may cause the hook K to oscillate laterally to keep the colter of the plow free from rubbish. The crank-arm J has several holes formed in it to receive the rear end of the rod H, so that a greater or less swing may be given to the hook K, as may be required. The rear end of the connecting-rod I is pivoted to the upper end of the bar L, which is pivoted to the side of the beam A, and the lower part of which projects downward along the land-side side of the colter of the plow C, so that the forward movement of the plow may oscillate the bar L longitudinally with the plow to keep it free from rubbish. The hook K and bar L may be made with sharp or blunt forward edges, as may be desired. To the other end of the pivot of the bar L is attached an upwardly-projecting arm, M, in which are formed several holes to receive the forward end of the rod N, which projects back into such a position that it may be reached and operated by the plowman with his hand, if desired, so that the bar L may be operated by hand or by the wheel E, as may be desired.

Having thus described my invention, what I claim as new, and desire to secure by Letters Patent, is—

The hook K and bar L, connected with the wheel E by the rods H I and cranks F G, in combination with the plow-beam A and plow C, substantially as herein shown and described.

HARVEY BLUE.

Witnesses:
J. O. HOGES,
ABRAHAM ZOCHNER.